United States Patent
Simons et al.

(10) Patent No.: US 9,451,678 B2
(45) Date of Patent: Sep. 20, 2016

(54) SYSTEM AND METHOD FOR COMMISSIONING LIGHTING USING SOUND

(71) Applicant: KONINKLIJKE PHILIPS N.V., Eindhoven (NL)

(72) Inventors: Paul Richard Simons, Cambridge (GB); Alan James Davie, Milton (GB); Aki Sakari Härmä, Eindhoven (NL); Stephen Michael Pitchers, Cambridge (GB); Ronaldus Maria Aarts, Geldrop (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 190 days.

(21) Appl. No.: 14/360,985

(22) PCT Filed: Nov. 16, 2012

(86) PCT No.: PCT/IB2012/056471
§ 371 (c)(1),
(2) Date: May 28, 2014

(87) PCT Pub. No.: WO2013/080082
PCT Pub. Date: Jun. 6, 2013

(65) Prior Publication Data
US 2014/0333206 A1 Nov. 13, 2014

Related U.S. Application Data

(60) Provisional application No. 61/565,098, filed on Nov. 30, 2011.

(51) Int. Cl.
*H04R 1/08* (2006.01)
*H05B 37/02* (2006.01)
*G01S 11/16* (2006.01)

(52) U.S. Cl.
CPC .......... *H05B 37/0236* (2013.01); *G01S 11/16* (2013.01); *H04R 1/08* (2013.01);
(Continued)

(58) Field of Classification Search
CPC ...... H05B 37/0236; H04R 1/08; G01S 11/16
USPC ........ 250/205; 315/132, 151, 363; 340/12.5, 340/686.6, 3.7, 9.14, 12.23; 348/169; 367/197; 381/56; 701/517
See application file for complete search history.

(56) References Cited

U.S. PATENT DOCUMENTS 4,476,554 A * 10/1984 Smith .................... H03K 17/28
307/117
5,726,644 A * 3/1998 Jednacz ................ H04L 1/1867
315/294

(Continued)

FOREIGN PATENT DOCUMENTS

GB 2355825 A 5/2001
JP 2006148357 A 6/2004

(Continued)

*Primary Examiner* — Gerald Gauthier
(74) *Attorney, Agent, or Firm* — Meenakshy Chakravorty

(57) ABSTRACT

A system and methods for automatically commissioning electrical fixtures using sound are disclosed. Electrical fixtures (140-149) detect sounds produced by a sound generator moved along a path (300) through installed fixtures according to a building plan (100). Each electrical fixture may be associated with a mapped fixture location in the building plan by correlating the detected sound with the location of the sound generator along the path.

17 Claims, 10 Drawing Sheets

(52) U.S. Cl.
CPC ....... *H05B 37/029* (2013.01); *H05B 37/0218* (2013.01); *H05B 37/0227* (2013.01); *H05B 37/0272* (2013.01); *Y02B 20/46* (2013.01)

(56) References Cited

U.S. PATENT DOCUMENTS

| | | | | |
|---|---|---|---|---|
| 5,905,442 A * | 5/1999 | Mosebrook | ............ | H03K 17/28 307/31 |
| 6,675,091 B2 * | 1/2004 | Navab | .................... | G01C 21/00 701/515 |
| 6,967,565 B2 * | 11/2005 | Lingemann | ............ | G05B 15/02 340/12.23 |
| 7,378,980 B2 * | 5/2008 | McFarland | ............ | G01S 5/0289 340/539.2 |
| 8,159,156 B2 * | 4/2012 | Henig | ................ | H05B 37/0254 315/294 |
| 8,759,734 B2 * | 6/2014 | Barrilleaux | ............ | G05D 25/02 250/205 |
| 8,981,913 B2 * | 3/2015 | Henig | ................ | H05B 37/0218 315/152 |
| 2009/0066473 A1 | 3/2009 | Simons | | |
| 2011/0031897 A1 | 2/2011 | Henig et al. | | |
| 2011/0199004 A1 | 8/2011 | Henig et al. | | |
| 2011/0285854 A1 * | 11/2011 | LaDuke | .................. | G01S 11/00 348/169 |
| 2012/0242231 A1 * | 9/2012 | Yianni | ................ | H05B 37/029 315/151 |
| 2014/0333206 A1 * | 11/2014 | Simons | .............. | H05B 37/0218 315/132 |

FOREIGN PATENT DOCUMENTS

| | | |
|---|---|---|
| WO | 2006095317 A1 | 9/2006 |
| WO | 2010064159 A1 | 6/2010 |
| WO | 2010097737 A1 | 9/2010 |

\* cited by examiner

SYSTEM AND METHOD FOR COMMISSIONING LIGHTING USING SOUND

CROSS-REFERENCE TO PRIOR APPLICATIONS

This application is the U.S. National Phase application under 35 U.S.C. §371 of International Application No. PCT/IB2012/056471, filed on Nov. 16, 2012, which claims the benefit of [e.g., U.S. Provisional Patent Application No. or European Patent Application No.] 61/565,098, filed on Nov. 30, 2014. These applications are hereby incorporated by reference herein.

TECHNICAL FIELD

The present invention is directed generally to an indoor network of electronic devices. More particularly, various inventive methods and apparatus disclosed herein relate to commissioning networked lighting fixtures according to a building plan.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications.

With the advent of digital lighting technologies, it is becoming increasingly popular to create lighting networks of LED-based lighting devices. These lighting systems are generally controlled through a network, wherein a data stream containing packets of information is communicated to the lighting devices. Each of the lighting devices may see all of the packets of information, but only respond to packets that are addressed to the particular device. Once a properly addressed packet of information arrives, the lighting device may read and execute the commands. This arrangement demands that each of the lighting devices have an address and these addresses need to be unique with respect to the other lighting devices on the network.

Lighting control for large buildings is generally handled by a building management system (BMS), which controls other aspects besides lighting (e.g. HVAC). Lighting is controlled by a lighting control system (LCS), which is often a component of a BMS. A wire bus is usually used to connect each lighting fixture in a daisy chain fashion back to the LCS. The LCS monitors the status of lighting fixtures within the building and allows remote control of these lighting fixtures, for example, by appropriately placed motion sensors, switches and other switching nodes. It collects statistics on light and power usage and can identify failing light sources, or light sources that are nearing the end of their working life. The LCS can be used to automatically notify maintenance teams when service is required.

Lighting fixtures are typically installed by an electrician in a large building according to a plan that specifies each light or device type, its position and its connection to the wire control bus. However, the identity of each of the installed lighting fixtures is not initially known to the LCS. Thus, the installation must be followed by a commissioning operation, i.e. a set of processes for identifying every lighting fixtures, switch and sensor in a building with the objective of setting up the appropriate control connections between them.

A controller may communicate with a lighting fixture, for example, over a communications network, where the controller controls the light fixture by transmitting commands containing information identifying the target lighting fixture. The controller must know the identifying information of the target fixture in order to send commands to the target fixture. Commissioning, then, may involve associating a physical fixture with a mapped fixture location. For example, each fixture may have a network address associated with it, whereas a building plan assigns a logical identifier to each fixture. The commissioning process associates a network address, such as a numerical identifier code of a fixture, with the logical identifier for that fixture on the building plan.

Commissioning may be performed manually. During the installation, the electrician may install a physical fixture and then manually record the identifier of the fixture on the building plan. The fixtures may then be commissioned by entering the recorded identifier into a fixture database that associates each physical identifier with a fixture in the building plan. Alternatively, a test signal may be used to cycle the power level of each light in turn. An installer or a similar specialist then walks around the building until the light is identified and matched to the plan. This is repeated until all lights are identified. It is then possible to assign each lighting unit to one or more relevant controllers.

Unfortunately, such manual commissioning is typically time consuming. Further, manual provisioning of fixtures may lead to errors, for example, data input mistakes. During the commissioning of a large building with many floors, there may be many commissioning errors. Such commissioning errors may lead to a controller sending commands to the wrong fixture, or commands that appear to have no effect. In such instances, the specialist may be required to debug the system to get it working as intended by the lighting designer. This can involve additional time and expense.

There have been attempts to automate the commissioning process. For example, a method for commissioning installed building service devices uses wireless radio frequency (RF) communication between building service devices to determine spatial positions of each device relative to three or more reference nodes by triangulation of the signal. The coordinates of the determined spatial positions of each device are transmitted to a building services commissioning system, which generates a spatial position map of the devices. This map may then be compared with a building services plan to obtain configuration data for each device. Based on the configuration data, configuration commands may be issued to each device to commission the system.

RF commissioning may be problematic because the ranging accuracy of affordable mass production RF chips is too large; typically greater than 2-5 m (ZigBee/WiFi) based on signal strength measurements. RF chips with greater accuracy, on the order of 50 cm, for example, ultra wide band (UWB) radios that may utilize time-of-flight measurements, are available in very small volumes and are expensive. Further, there is currently poor standardization of UWB radios, making interoperability problematic between different chip suppliers. Further, lighting electronics are normally housed in the ballast of a metal lighting enclosure that shield RF signals, thereby requiring an external antenna, adding further expense, complexity and logistical difficulties to the system.

And so, known techniques for commissioning lighting fixtures according to a building plan are often expensive, error-prone, and/or time-consuming.

Thus, there is a need in the art to reliably commission networked lighting fixtures with minimal expense and complexity. Also, it is desirable to enable commissioning to be done faster and more accurate than conventional commissioning methods. Further, it is desirable for commissioning to be reliably performed by individuals with less specialized skills than, for example, an experienced electrician or a lighting designer.

SUMMARY

The present disclosure is directed to inventive methods and systems for automatically commissioning electrical fixtures using sound. For example, electrical fixtures fitted with microphones may detect sounds produced by a sound generator moving along a prescribed path through installed electrical fixtures according to a building plan. Each microphone records a timestamp for each detected sound. The microphone closest to the sound generator will detect the sound first, followed by the second closest microphone, and so forth. The relative timing of the detected sound by each microphone is compared and used to determine the relative distance from each microphone from the source of the sound. Each electrical fixture may then be associated with a mapped electrical fixture in the building plan by correlating the timestamp of each detected sound with the location of the sound generator along the prescribed path according to the difference in the arrival time of each sound at each microphone.

Generally, in a first aspect, the invention contemplates a method for automatically commissioning a first fixture having a first microphone and a second fixture having a second microphone according to a building plan having a first mapped location and a second mapped location. The method includes the steps of generating a first sound at a first location, detecting the first sound by the first microphone and by the second microphone, generating a second sound at a second location, detecting the second sound by the first microphone and by the second microphone; and associating the first fixture with the first mapped location.

Under a first embodiment of the first aspect, the method includes a step of associating the first fixture with the second mapped location. Versions of the first embodiment include the steps of recording a first time when the first microphone detects the first sound, recording a second time when the second microphone detects the first sound, recording a third time when the first microphone detects the second sound, and recording a fourth time when the second microphone detects the second sound, wherein the associating the first fixture with the first mapped location is based in part upon the first, second, third and fourth time.

Another variation includes the steps of determining a first distance between the first microphone and the first location, based upon the first time, determining a third distance between the first microphone and the second location, based upon the third time, determining a second distance between the second microphone and the first location, based upon the second time, and determining a fourth distance between the second microphone and the second location, based upon the fourth time. The first location and the second location may be along an arbitrary path, or along a predetermined path. The first sound may be a first footstep and the second sound may be a second footstep. The first fixture may be a first luminaire and the second fixture may be a second luminaire.

The first fixture further may include a first clock, and the second fixture further may include a second clock. A step may include synchronizing the first clock with the second clock.

Under a second embodiment of the first aspect, the method includes a step of acknowledging associating the first fixture with the first mapped location with a visible response by the first luminaire. Further steps may include generating a third sound, wherein the third sound is audibly distinct from the first sound and the second sound, and detecting the third sound with the first microphone, wherein the first sound is substantially audibly indistinguishable from the second sound. An optional step may be, in response to the detecting the third sound, dis-associating the first fixture with the first mapped location, or, in response to the detecting the third sound, ending the automatic commissioning method.

Generally, in a second aspect, the invention relates to a method for automatically commissioning a first fixture having a first microphone and a second fixture having a second microphone according to a building plan having a first mapped location and a second mapped location, which includes the steps of generating a substantially fixed frequency tone with a tone generator at a first location, detecting the tone by the first microphone and by the second microphone, moving the tone generator to a second location, detecting a Doppler shift of the tone by the first microphone, and associating the first fixture with the first mapped location.

Generally, in a third aspect, the invention relates to a system for automatically commissioning fixtures according to a building plan having a first mapped location and a second mapped location, which includes a lighting control system in communication with a data network, a first fixture comprising a first microphone in communication with the data network, wherein the first fixture is configured to transmit detection notification of each of a plurality of sounds to the lighting control system, and a second fixture comprising a second microphone in communication with the data network, wherein the second fixture is configured to transmit detection notification of each of the plurality of sounds to the lighting control system. The lighting control system is configured to associate the first fixture with the first mapped location and the second fixture with the second mapped location based upon receiving the detection of the plurality of sounds from the first fixture and the second fixture.

In an embodiment of the third aspect, the data network may be a wired network. The wired network may communicate data over power lines providing power to the first fixture, the second fixture, and the lighting control system. Alternatively, the data network may be a wireless network. According to the third aspect, the plurality of sounds may be footsteps.

Generally, in a fourth aspect, computer readable media is configured to execute a method for automatically commissioning a first fixture having a first microphone and a second fixture having a second microphone according to a building plan having a first mapped location and a second mapped location. The method includes the steps of receiving notification of detection by the first fixture of each of a plurality of sounds, receiving notification of detection by the second fixture of each of the plurality of sounds, and associating the first fixture with the first mapped location and the second fixture with the second location based upon receiving the detection of the plurality of sounds from the first fixture and the second fixture.

The term "light source" should be understood to refer to any one or more of a variety of radiation sources, including, but not limited to, LED-based sources, incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

The terms "lighting fixture" and "luminaire" are used interchangeably herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Generally, Applicants have recognized and appreciated that it would be beneficial to automatically commission a lighting system by detecting sounds generated by a person or device traversing a region represented by a building plan.

In view of the foregoing, various embodiments and implementations of the present invention are directed to commissioning elements of a lighting system using sound. In general, an exemplary embodiment of a system for commissioning is described, followed by descriptions of exemplary embodiments of methods for commissioning using sound, including using limited duration sounds where the detecting elements are synchronized, using limited duration sounds where the detecting elements may not be synchronized, using continuous and/or semi continuous sounds, and methods where the path of the sound source may be prescribed and/or where the path may be arbitrary.

Figure 1:
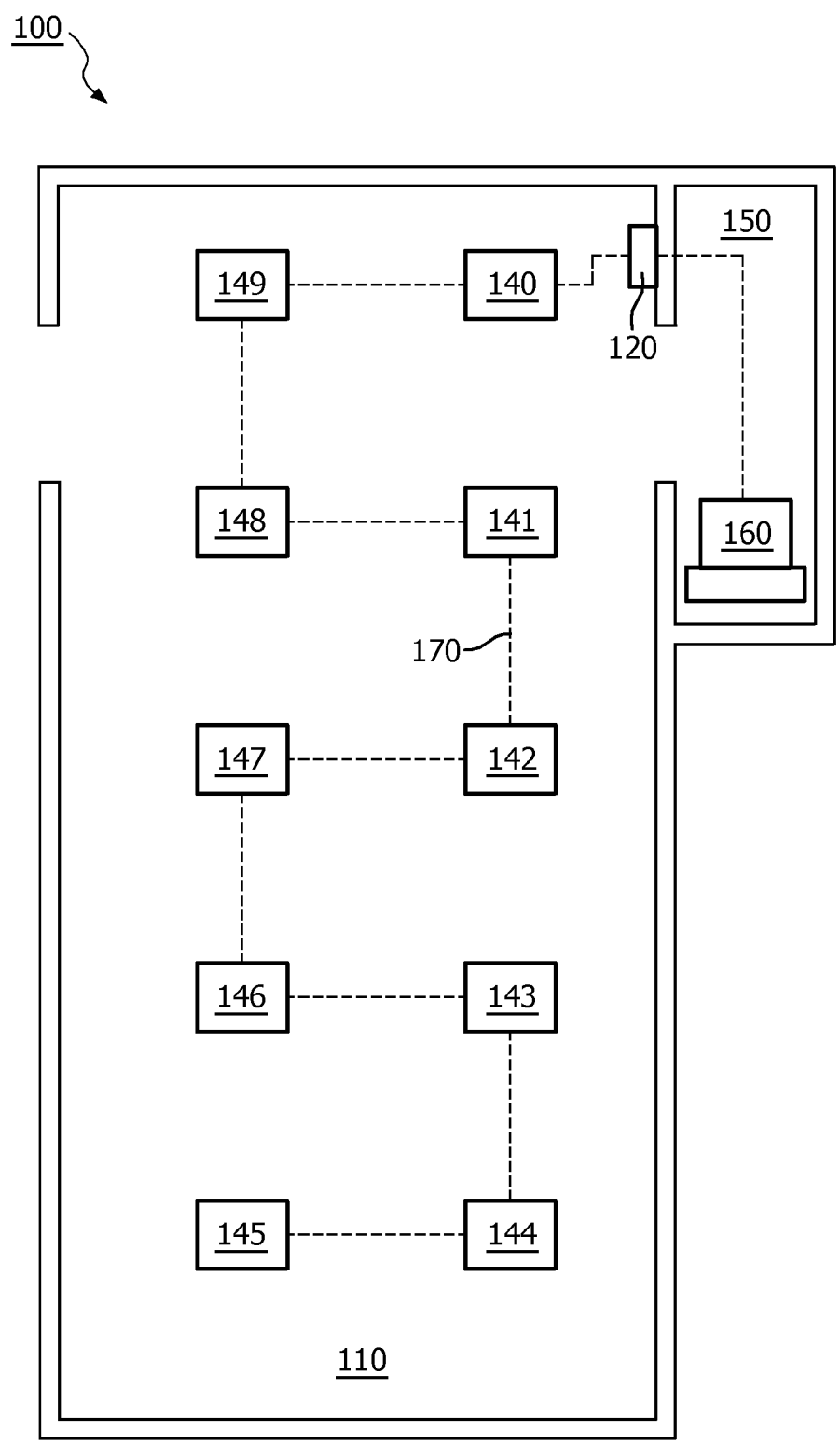
FIG. 1 is a schematic diagram of a simplified building plan mapping electrical fixtures for a two room building.

Referring to FIG. 1, in a first exemplary embodiment, a building plan 100 includes a plurality of luminaires 140-149 and a controller 120 in a first room 110, and a lighting control system (LCS) 160 in a second room 150. The controller 120 controls the plurality of luminaires 140-149, and may be, for example, but not limited to, a switch or a dimmer. Each luminaire 140-149 includes a microphone. The microphone may be, but is not limited to, a dynamic microphone, a condenser microphone, or a contact microphone. Of course, other microphone types may be used. Similarly, the controller 120 may include a microphone.

The plurality of luminaires 140-149, the controller 120 and the lighting control system 160 are connected by a data network 170, depicted in FIG. 1 by a dashed line. The data network 170 may use hard-wired connections, or may be a wireless network. A hard-wired data network 170 may use dedicated data lines, or may communicate data over power lines, for example, power lines used to provide power to the plurality of luminaires 140-149. A wireless data network 170 may use, for example, RF, BlueTooth, ZigBee, WiFi, etc.

Each luminaire 140-149 is configured to communicate data over the data network 170 using, for example, a data network interface or controller, as is familiar to persons having ordinary skill in the art. The data communicated over the data network 170 may include, but is not limited to, commands, signals, status information, and digital and/or analog sound.

Devices that communicate over the data network 170, such as luminaires 140-149 and the controller 120, may be referred to as network elements. Network elements may communicate over the data network 170 using a network protocol, for example, TCP/IP. The network elements in the first embodiment include the plurality of luminaires 140-149, the controller 120, and the LCS 160. In order for the network elements on the data network 170 to communicate over the data network 170, a network address may be assigned to each network element. Each network element may have a hardware identifier. The hardware identifier may be, for example, a mac address. The hardware identifier may also include information fields, such as a device type. Commissioning, then, may involve associating a network address with each hardware identifier, and further associating each hardware identifier with a network element on the building plan 100. It should be noted that while the embodiments herein generally refer to the commissioning of luminaires, there is no objection to commissioning other elements depicted in a lighting plan, for example, controllers and/or sensors, using similar techniques.

The first exemplary embodiment of the building plan 100 shown in FIG. 1 is a simplified building plan. While the building plan 100 includes ten luminaires 140-149 and one controller 120, there is no objection to more or fewer luminaires and controllers. Similarly, there is no objection to additional elements in the building plan, such as sensors (not shown).

Figure 2:
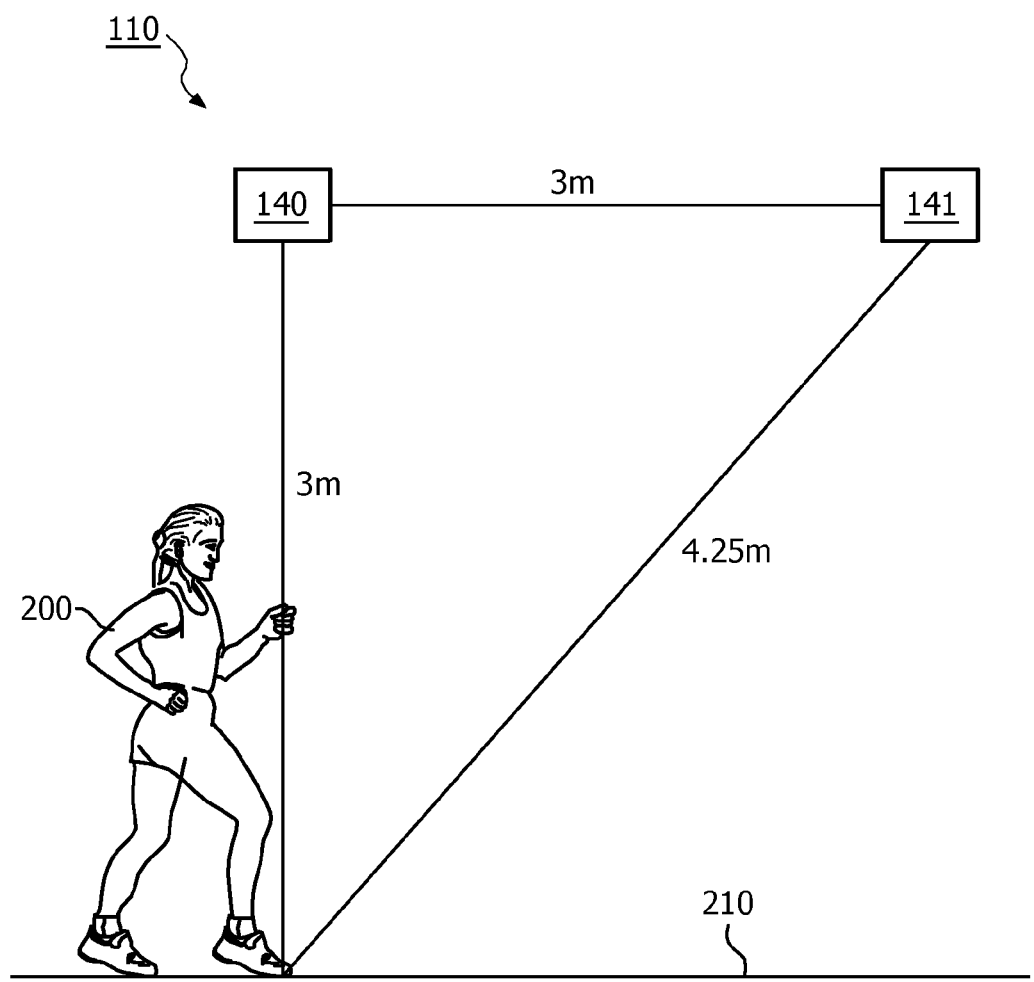
FIG. 2 is a schematic diagram illustrating the spatial relation between a commissioning specialist and luminaires

The plurality of luminaires 140-149 may be commissioned using sound. Under the first embodiment, a person commissioning the building plan, hereinafter the "commissioner," traverses the first room 110 generating a series of short duration sounds, for example, but not limited to impulse sounds, hereinafter, the "commissioning sound." As shown in FIG. 2, the commissioning sound under the first embodiment is the sound of a footstep of the commissioner 200 on the floor 210 of the first room 110. A first luminaire 140 and a second luminaire 141 are positioned so that their respective microphones are 3 meters above the ground. The first luminaire and the second luminaire are spaced 3 meters apart.

In the example shown by FIG. 2, the commissioner 200 generates a footstep sound directly beneath the first luminaire 140. The distance the sound travels from the source of the footstep sound to the first luminaire 140 is 3 meters, while the distance the sound travels from the source of the footstep sound to the second luminaire 141 is approximately 4.25 meters. Therefore, the sound of the footstep arrives at the first luminaire 140 before it arrives at the second luminaire 141.

Figure 3:
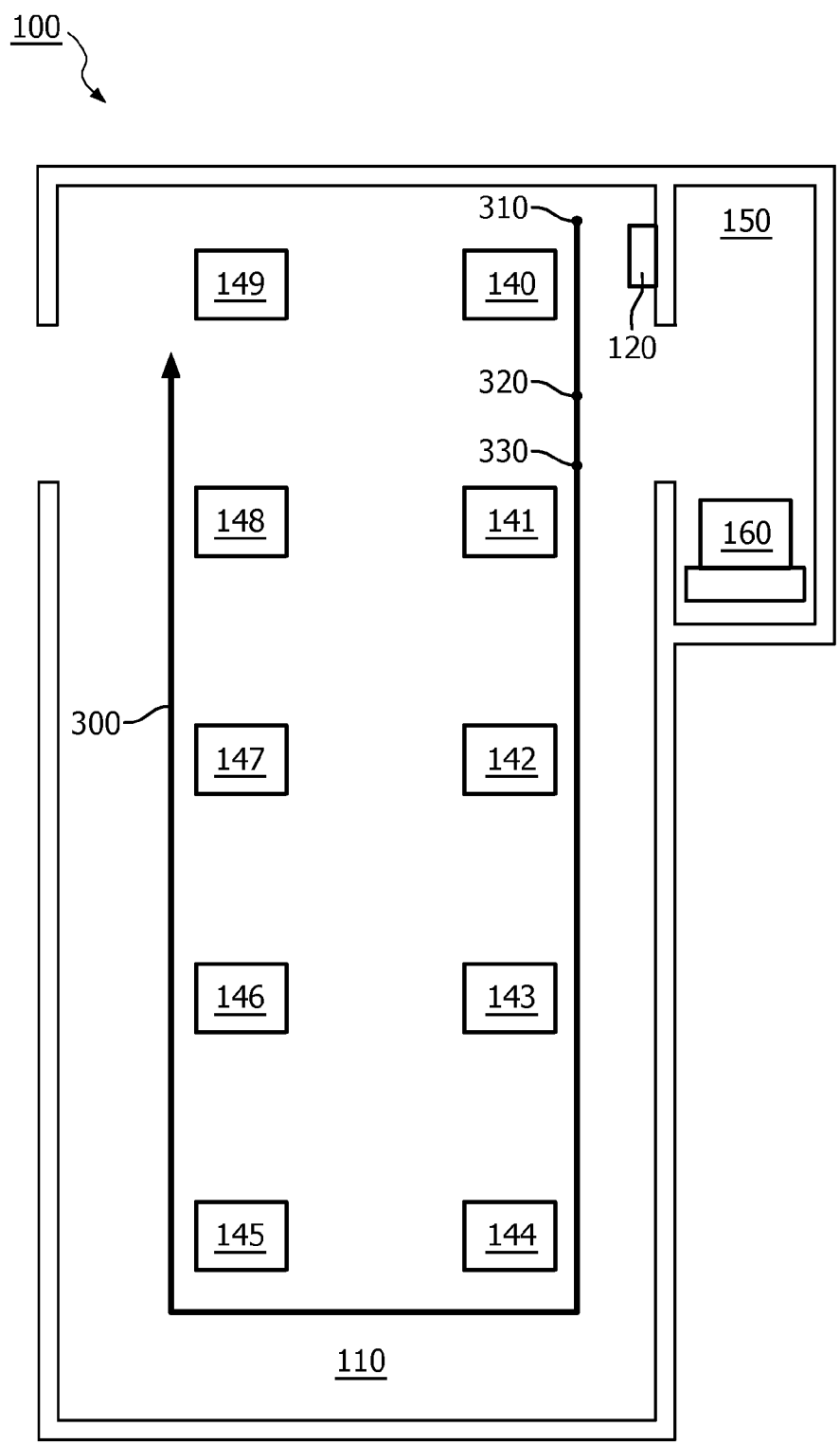
FIG. 3 illustrates an exemplary embodiment of a prescribed commissioning path superimposed on the simplified building plan.

As shown by FIG. 3, the commissioner 200 (FIG. 2) travels through the first room 110 according to a prescribed commission path 300. While the first embodiment describes commissioning when the commissioner 200 (FIG. 2) follows a prescribed commission path 300, the commissioner 200 (FIG. 2) may also travel through the first room 110 via an arbitrary path, as is described hereinafter.

Referring to FIG. 3, a microphone in each luminaire 140-149 may detect the commissioning sound. Hereinafter, a description of a luminaire 140-149 detecting a sound shall refer to a microphone in the luminaire 140-149 detecting the sound. Similarly, a description of a luminaire 140-149 communicating data shall refer to a network interface within the luminaire 140-149 communicating data over the data network 170 (FIG. 1).

Each luminaire 140-149 may be configured with a sound threshold, such that sounds having an amplitude below the sound threshold are ignored, while sounds having an amplitude at or above the sound threshold are processed. Further, each luminaire 140-149 may be configured to filter the detected sound so that only sounds within a specified frequency range are processed. For example, dynamic filtering may be used to boost a region of the sound frequency spectrum that is relevant for the commissioning sound. Under the first embodiment, the frequency spectrum may be filtered to enhance the detection of footsteps.

Detection of each commissioning sound by each luminaire 140-149 generally causes the luminaire 140-149 to send a signal over the data network 170 (FIG. 1), for example, to the lighting control system 160. The signal may be, for example, a detection notification message that includes, for example, a timestamp, a device ID that indicates the device type, such as a luminaire 140-149, an opcode indicating detection of a sound, a sound level, and a sound duration, among other data.

The commissioner 200 (FIG. 2) may walk substantially along the prescribed commission path 300 according to the building plan 100. Each step the commissioner 200 (FIG. 2) takes along the prescribed commission path 300 generates a footstep sound. The sounds of footsteps are identified by the local luminaires 140-149, so that the nearest luminaire 140-149 can be identified, for example, by comparing the arrival times of the detected sound at each luminaire 140-149. The location of each luminaire 140-149 may be matched to a corresponding luminaire 140-149 according to the building plan 100 to enable the correct control connections to be commissioned, enabling the commissioned luminaire to be controlled via the data network 170 (FIG. 1).

The sound of a footstep depends on several factors, for example, the material of the floor and the footwear worn by the commissioner 200 (FIG. 2). In typical applications the commissioner 200 (FIG. 2) is wearing shoes and the floor material is hard, for example wood, vinyl, stone, or tiles, which is common at work places and public spaces. The processing of microphone signals may involve noise reduction, for example, noise reduction based on a model of the background noise and dynamic filtering to boost the spectrum region that is relevant for the step sounds. The actual sound detection method may be based on one of several alternative techniques known by persons having ordinary skill in the art of environmental sound recognition.

Reliable recognition of footstep sounds and walking is possible even from luminaires a large distance away. The distance may vary based on, for example, differences in the type of shoes, individual walking style of the commissioner 200 (FIG. 2), and sounds produced by other clothing, for example, legs of trousers.

As the commissioner 200 (FIG. 2) walks along the prescribed path 300 through the first room 110 under the luminaires 140-149, a series of discrete footstep sounds is made, each footstep typically, for example, 0.8 m apart. However, there is no objection to closer or further footstep spacing, or irregular footstep spacing. A first footstep 310, a second footstep 320, and a third footstep, 330, are denoted along the prescribed path 300. The commissioner 200 (FIG. 2) may deliberately walk under the luminaires 140-149 along the prescribed path 300 at a steady speed. Each footstep provides a point source of sound that may be heard by one or more luminaires 140-149. A time reference is recorded for each luminaire 140-149 that detects each footstep 310, 320, 330. The closer the footstep 310, 320, 330 is to each luminaire, the shorter time it takes for the sound of the footstep to travel from the location of the footstep 310, 320, 330 to the luminaire 140-149.

Two or more measurements may enable the establishment of the position of each luminaire 140-149. As described further below, the position of each luminaire 140-149 may be calculated using enables time-difference of arrival techniques.

The commissioning sound of footsteps produced by the commissioner 200 (FIG. 2) walking along the prescribed path 300 down a line of luminaires 140-149 may identify the order in which the luminaires 140-149. Each location may be determined by comparing the arrival time of each footstep. The closest luminaire 140-149 to the footstep detects the earliest arrival time, with the detection by the other luminaires 140-149 occurring thereafter.

A typical office installation may have lights separated by 3 m. This geometry is illustrated in FIG. 2 with luminaires 140, 141 3 m apart along a 3 m high ceiling. The difference in distance from the footstep position of the commissioner 200 to neighboring lights varies between zero and 1.25 m. The speed of sound travels at 340 m/s, so a 1.25 m difference in flight time from foot to a luminaire 140, 141 results in 3.7 ms difference in arrival time, which is easily detectable.

FIG. 3 shows a lighting plan 100 for an office to be commissioned. As noted previously, each of the luminaires 140-149 indicated is equipped with a microphone. The height of the ceiling is 3 m above the floor. A commissioner 200 (FIG. 2) walks according to the prescribed commission path 300 under the line of luminaires 140 to 144 until roughly beneath an end luminaire 144, then turns to walk to luminaire 145 and turns to walk back through the office towards luminaire 149. In this example, the lights are arranged in a grid of 3 m separation. As the commissioner 200 (FIG. 2) walks along the prescribed path 300, the sound of footsteps is audibly distinguishable over a range of 7 m from the sound source.

A first footstep 310, a second footstep 320, and a third footstep 330 are indicated along the commission path 300. It should be noted that the first footstep 310 and the second footstep 320 may not be consecutive. In other words, there may be one or more intervening footsteps between the first footstep 310 and the second footstep 320, but any such intervening footsteps are omitted from this analysis to simplify the description. Similarly, there may be intervening footsteps between the second footstep 320 and the third footstep 330.

Under the first embodiment, the commissioning path 300 is known in advance. Therefore, the arrival times of the footstep 310, 320, 330 sounds can be used to identify the luminaires 140-149 in turn as the commissioner 200 (FIG. 2) walks under each luminaire 140-149 and it clearly becomes distinguishable which luminaire 140-149 the closest to each detected footstep.

Preferably, each luminaire 140-149 to be commissioned may indicate to the commissioner 200 (FIG. 2) that it has been identified. For example, a luminaire 140-149 may be dimmed or switched off to indicate to the commissioner 200 (FIG. 2) that it has been identified. This may also indicate which luminaires 140-149 have been commissioned and which have still to be identified. In this way each luminaire 140-149 on the building plan 100 may be commissioned.

Figure 4A:
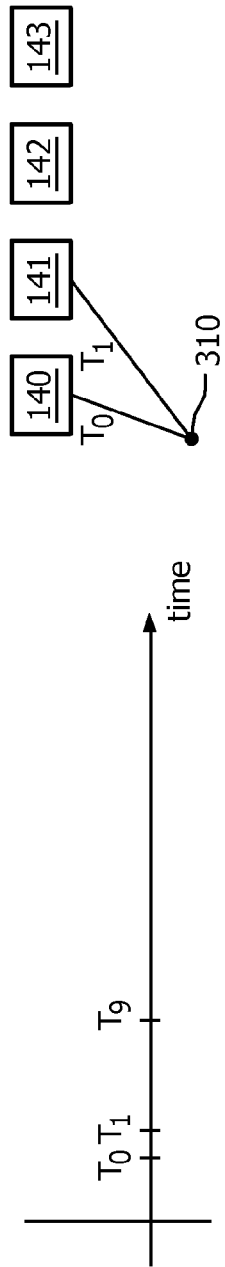
FIGS. 4A-4C are timing diagrams illustrating the time of flight from a sound source to multiple fixtures.
Figure 4B:
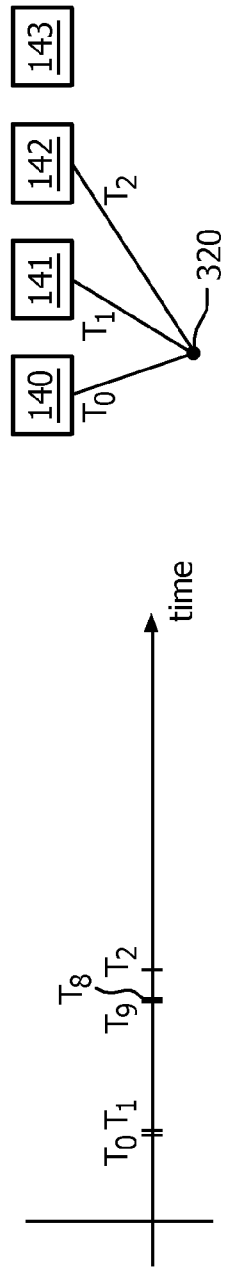
Figure 4C:
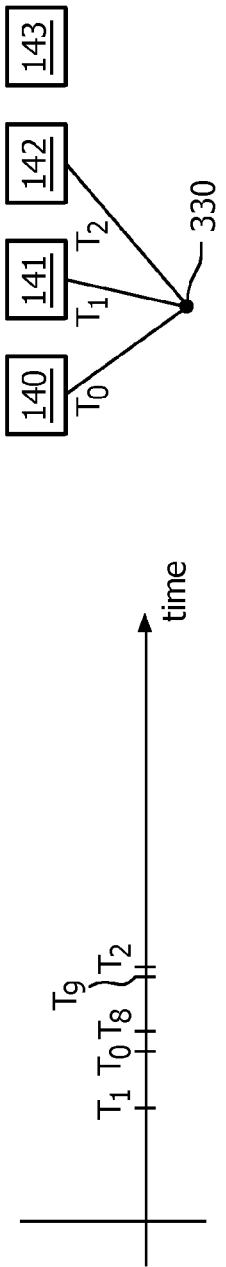

FIGS. 4A-4C show three instances that illustrate the timing of detecting sounds of the first footstep 310, the second footstep 320, and the third footstep 330 at nearby luminaires 140-149 (FIG. 3). On the right of each drawing is an image that shows the position of the commissioner 200 (FIG. 2) walking under the line of luminaires 140-149 (FIG. 3). On the left of each drawing is a plot of the timing of the sound of each footstep 310, 320, 330 as received by luminaire 140-149, where $T_0$ represents the time for the sound of a footstep 310, 320, 330 to reach luminaire 140, $T_1$ represents the time for the sound of a footstep 310, 320, 330 to reach luminaire 141, and $T_2$ represents the time for the sound of a footstep 310, 320, 330 to reach luminaire 142. Similarly, $T_8$ represents the time for the sound of a footstep 310, 320, 330 to reach luminaire 148 (FIG. 3), and $T_9$ represents the time for the sound of a footstep 310, 320, 330 to reach luminaire 149 (FIG. 3), although luminaire positions 148 (FIG. 3) and 149 (FIG. 3) are not depicted in FIGS. 4A-4C.

As shown by FIG. 4A, the first footstep 310 is detected by luminaires 140, 141 and also luminaire 149 (FIG. 3). Luminaire 140 is clearly the closest luminaire based on the arrival time of the sound, as shown by time $T_0$ being detected before time $T_1$ and time $T_9$. Note that the remaining luminaires 142-148 may not detect the first footstep 310, or the sound level of the first footstep 310 may not meet a sound threshold for luminaires 142-148.

As shown by FIG. 4B, the second footstep 320 is detected by luminaires 140, 141, 142, and also luminaires 148 (FIG. 3), 149 (FIG. 3). Luminaire 140 is the closest to the second footstep 320, based on the arrival time of the sound, as shown by time $T_0$ being detected shortly before time $T_1$. The sound of the second footstep 320 is also detected at later times $T_9$, $T_8$, and $T_2$, which correspond to luminaires 149, 148 and 142 being located at relatively greater distances from the second footstep 320 than luminaires 140 and 141. The remaining luminaires 143-147 do not detect the second footstep 320. The timing in FIG. 4B indicates that the second footstep 320 is located just before the midpoint distance between two luminaires 140, 141 along the commission path 300 (FIG. 3).

As shown by FIG. 4C, the third footstep 330 is detected by luminaires 140, 141, 142, and also luminaires 148 (FIG. 3), 149 (FIG. 3). Luminaire 141 is now the closest to the third footstep 330, based on the arrival time of the sound, as shown by time $T_1$ being detected before time $T_0$. The sound of the third footstep 330 is detected at later times $T_8$, $T_9$, and $T_2$, which correspond to luminaires 148, 149 and 142 located at relatively greater distances from the third footstep 320. The remaining luminaires 143-147 do not detect the third footstep 330. The timing in FIG. 4C indicates that the third footstep 330 is located beyond the midpoint distance between two luminaires 140, 141 along the commission path 300 (FIG. 3).

Returning to FIG. 3, by comparing the relative times each footstep along the commissioning path 300 is received by the luminaires 140-149, the location of the luminaire 140-149 may be correlated with positions on the building plan 100.

FIG. 4 shows that multiple measurements may be used to develop an understanding of the commissioner 200 (FIG. 2) approaching each luminaire 140-149, walking underneath each luminaire (where the assignment can be made) and then the commissioner 200 (FIG. 2) receding as other luminaires 140-149 become closer to the sound source. Therefore, a single measurement may not be sufficient to make a commissioning assignment, but each successive measurement may incrementally support an understanding of the movement of the commissioner 200 (FIG. 2).

The commissioning sound, for example, a footstep, may be referred to as a primary commissioning sound. The primary commissioning sound may be created, for example, using specific shoes that produce characteristic sounds during walking. Returning to FIG. 3, in the event that a luminaire 140-149 does not signal it has been identified as the commissioner 200 (FIG. 2) passes the luminaire 140-149, the commissioner 200 (FIG. 2) may create a secondary commissioning sound. For example, the commissioner 200 (FIG. 2) may stop under the luminaire 140-149 and stamp on the floor or walk on the spot. Similarly, if an error occurs and the wrong luminaire 140-149 is assigned, the commissioner 200 (FIG. 2) may make the secondary commissioning sound, or alternatively, make a tertiary commissioning sound to stop the process or undo the last assignment. For example, the commissioner 200 (FIG. 2) may clap his hands a first time to undo the assignment, reposition himself and clap hands a second time to restart the commissioning process at the appropriate position, thereby correcting unanticipated or erroneous commissioning assignments. A person having ordinary skill in the art will recognize that different distinguishable sounds may be used to signal various events or conditions that may occur during the commissioning process.

Variations of the first embodiment may use different commissioning sounds. For example, while the first embodiment is described using footsteps as the commissioning sound, there is no objection to using other commissioning sound generators, for example, a whistle, a small handheld speaker or cellular telephone or smart phone. For a smart phone, the playback of a commissioning sound may be continuous or repetitive sound, a sound triggered by user interaction, or sound triggered by some measurement, for example, accelerometer reading that would synchronize the sound emission with the movements of the person during walking.

There may be geometric advantages to using a sound source elevated above the floor closer to the speakers, so that the lateral displacement of the sound generator from the microphones is proportionally larger from the vertical displacement. Further geometric advantages may be realized by positioning the commissioning sound generator at an elevation closer to the luminaires, for example, carrying the commissioning sound generator on a pole. There may be advantages to using footsteps as a commissioning sound. For example, footsteps are not a moving sound source, so the Doppler Effect may be disregarded in the detection process. In particular, the frequency of the commissioning sound will be substantially similar as detected by all luminaires, regardless of whether the commissioner 200 (FIG. 2) is moving or not, or the direction the commissioner 200 (FIG. 2) is moving in relation to each luminaire 140-149. Also, footsteps always emanate from a fixed elevation, the floor, which may simplify the geometry involved in comparing the distance traveled by sound waves from footsteps in different locations. It should be noted that a time interval between commissioning sound does not have to be regular, or known.

There is no objection to producing a commissioning sound other parts of the body than the feet, for example the hands. The commissioner 200 (FIG. 2) may also carry a sound generator, in particular mounted on or in one of his shoes, so that the texture of the floor is not of importance to creating a specific commissioning sound. Also specially designed shoes could be made such that the act of walking causes the shoes to make mechanical sounds, for example, chirps, which are consistent in tone and amplitude and easier to detect than footsteps.

System

Figure 5:
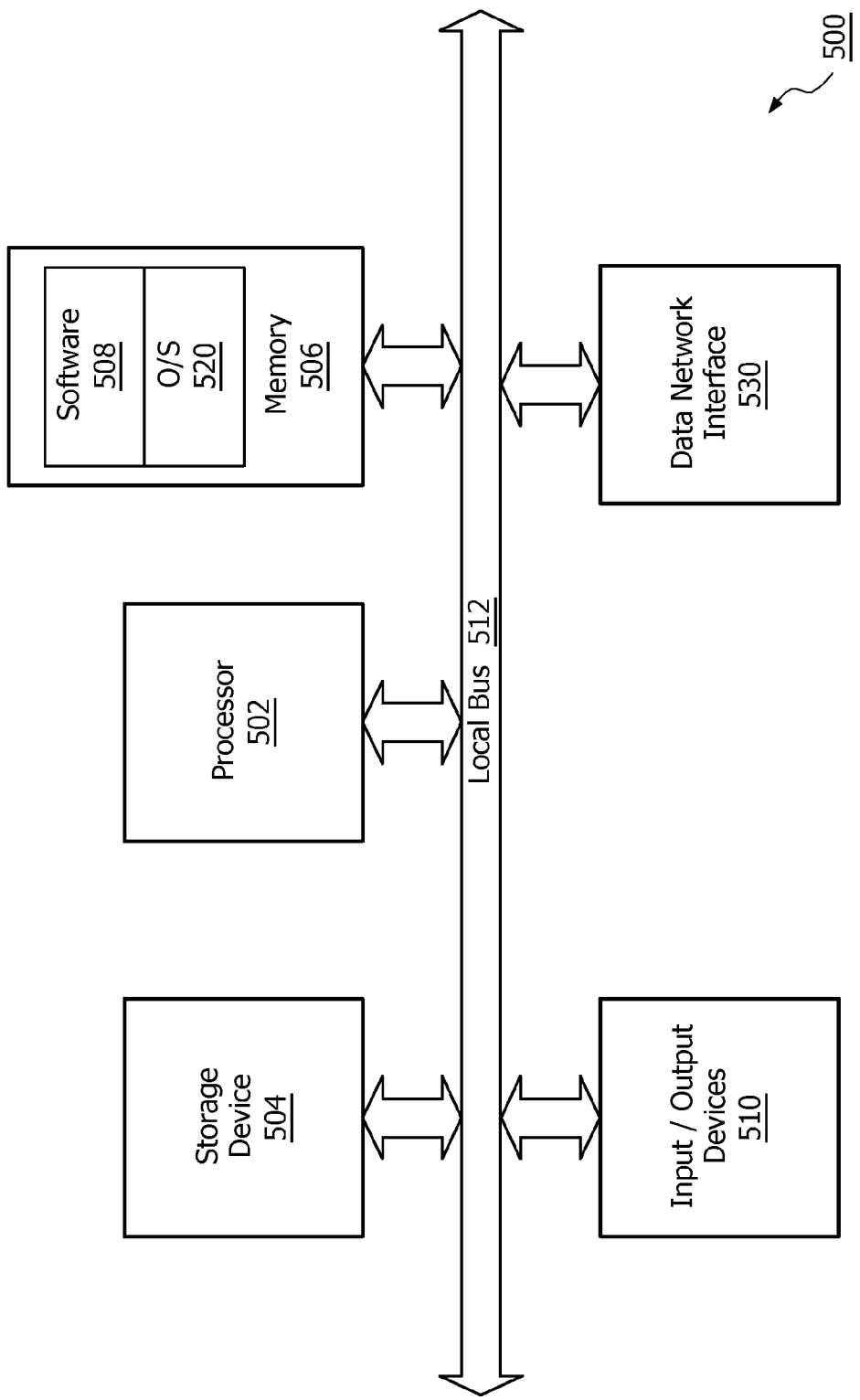
FIG. 5 is a schematic diagram of an exemplary embodiment of a lighting control system.

A system for executing the functionality described herein may be a computer, an example of which is shown in the schematic diagram of FIG. 5. The system 500 may be included in the lighting control system 160 (FIG. 3), or may be separate from the lighting control system 160 (FIG. 3). The system 500 contains a processor 502, a storage device 504, a memory 506 having software 508 stored therein that defines the abovementioned functionality, input and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semi-conductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, etc. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

A data network interface 530 is in communication with the local bus 512. The data network interface 530 may be in communication with, for example, the lighting control system 160 (FIG. 1), and communicate data that is accumulated by the lighting control system from luminaires 140-149 (FIG. 1) and controllers 120 (FIG. 1) as communicated over the data network 170 (FIG. 1). Alternatively, the data network interface 530 may be in communication with the data network 170 (FIG. 1), and therefore communicate directly with any devices in communication with the data network 170 (FIG. 1), for example, the luminaires 140-149 (FIG. 1) and the controller 120 (FIG. 1).

The luminaire location calculations may be performed by a centralized processor 502, or may be performed by two or more processors 502 that may be local to one another or distributed along a network, in communication using the data network interface 530.

Since the time between commissioning sounds is typically very long (on the order of seconds) compared to the detection time of the commissioning sound at each luminaire 140-149 (FIG. 3) (on the order of milliseconds), it is relatively simple to differentiate distinct impulse sound events. The relative distance of each luminaire 140-149 (FIG. 3) from the location of the commissioning sound may be calculated. In the first embodiment, where the commissioning path 300 (FIG. 3) is prescribed, each successive sound event occurs essentially along the commissioning path 300 (FIG. 3). When the processor determines the location of a luminaire 140-149 (FIG. 3) relative to the building plan 100 (FIG. 3), all future sounds detected by the located luminaire 140-149 (FIG. 3) may be used as a known point of reference, further simplifying the location calculation for the as yet un-located luminaires.

Commissioning Method with Synchronized Luminaires Detecting Limited Duration Commissioning Sounds Along a Prescribed Path A first embodiment of an exemplary method for commissioning luminaires with sound according to a building plan assumes that a commissioner is generating a series of limited duration commissioning sounds, for example, footsteps, while traveling along a prescribed path corresponding to the building plan. The location of each luminaire is determined based on calculating the time of flight of each commissioning sound to the luminaire, where the luminaire closest to each commissioning sound is assumed to detect the commissioning sound first.

Returning to FIG. 1, the first embodiment assumes the luminaires 140-149 are synchronized to a common time source. The luminaires 140-149 may each have a local processor, where the local processor is synchronized with other processors in the data network 170, so that time stamps assigned to detected sounds are synchronized relative to one another. Alternatively, the timestamp may not be added by a local processor. Instead, each luminaire 140-149 may generate a message to a centralized processor, for example, in the lighting control system 160, indicating that the luminaire 140-149 has detected a commissioning sound, and the centralized processor then attaches a timestamp to the received message. The message identifies the sending luminaire, for example, the physical address of the luminaire. In this case, the relative latency between the luminaire detecting a sound and the time the luminaire sends the message to the centralized processor may be very small, or may be very consistent across all microphones to preserve the relative timing from each fixture.

Figure 6:
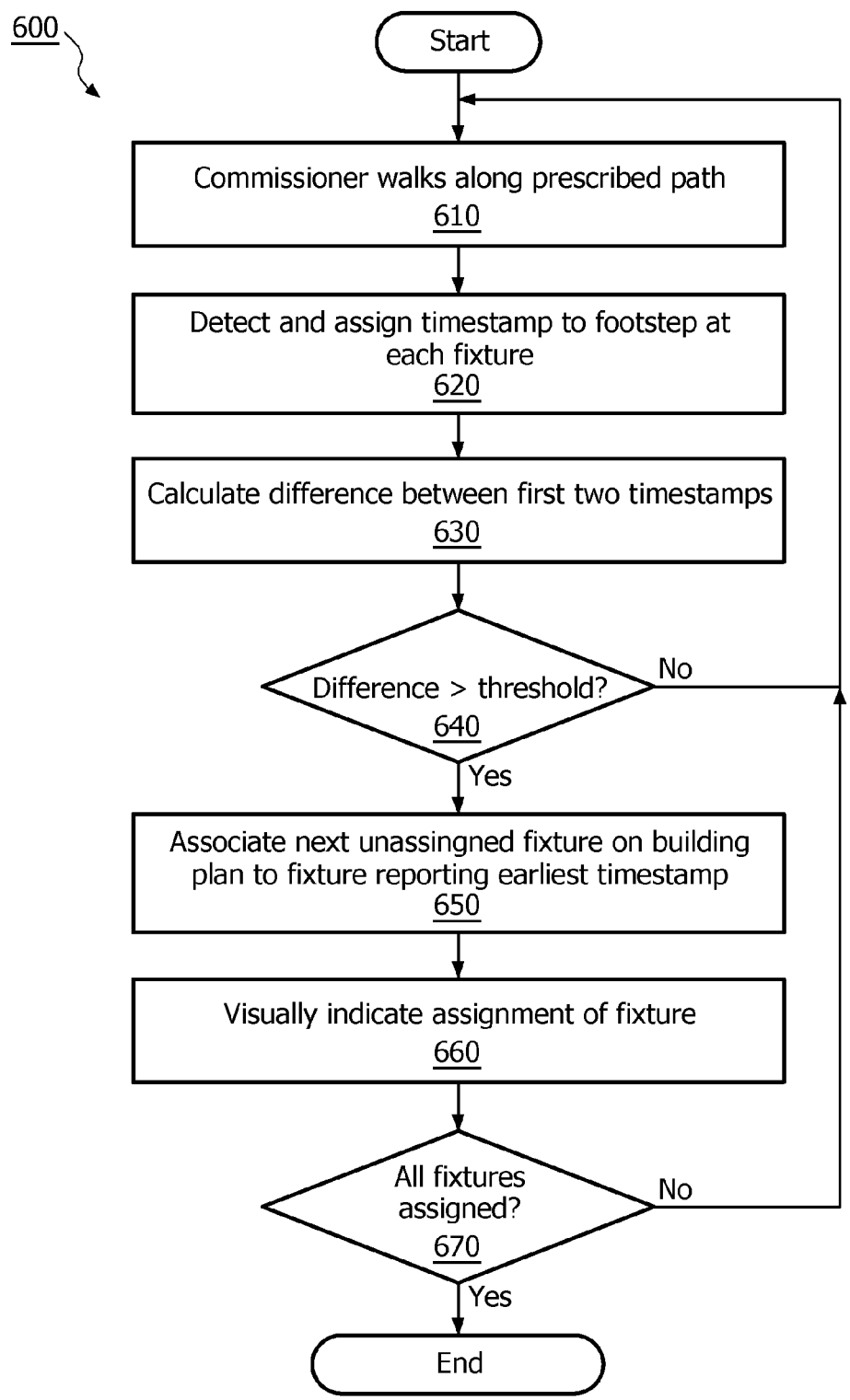
FIG. 6 is a flowchart of an exemplary method for commissioning lighting with sounds along a prescribed commissioning path.

FIG. 6 is a flowchart 600 of the first exemplary commissioning method. It should be noted that any process descriptions or blocks in flow charts should be understood as representing modules, segments, portions of code, or steps that include one or more instructions for implementing specific logical functions in the process, and alternative implementations are included within the scope of the present invention in which functions may be executed out of order from that shown or discussed, including substantially concurrently or in reverse order, depending on the functionality involved, as would be understood by those reasonably skilled in the art of the present invention.

The commissioner 200 (FIG. 2) walks along a prescribed path, as shown by block 610. The prescribed path preferably guides the commissioner 200 (FIG. 2) within close proximity of the fixtures to be commissioned. As noted previously, a fixture may be, for example, but not limited to, a luminaire, a light control, and/or a sensor. The commissioner 200 (FIG. 2) periodically generates a commissioning sound, for example, a footstep. As shown by block 620, each fixture detects commissioning sounds in the vicinity of the fixture, and a timestamp corresponding the time of detection is assigned to the commissioning sound. The earliest two timestamps corresponding to a particular commissioning sound are identified and compared, as shown by block 630. If the difference between the earliest two times exceeds a time threshold, the commissioning sound may be considered to have occurred closest to the first fixture in the building plan along the prescribed path, as shown by decision block 640. If, in contrast, the difference in time between the first two timestamps is below the time threshold, it may be unclear which fixture the commissioning sound was closest to, and the data corresponding to the commissioning sound may be disregarded in favor of a subsequent commissioning sound.

The fixture in the building plan corresponding to the next unassigned fixture along the commissioning path is associated with the fixture that detected the commissioning sound having the earliest timestamp, as shown by block 650. This fixture is thereby considered to have been commissioned, and the fixture then visually indicates the assignment, for example, by dimming or turning off, as shown by block 660. If all the fixtures have been assigned, as shown by decision block 670, the process ends. If one or more fixtures have not been assigned, the commissioner 200 (FIG. 2) proceeds along the commissioning path, as shown by block 610.

Commissioning Method with Unsynchronized Luminaires Detecting Limited Duration Commissioning Sounds Along a Prescribed Path The first exemplary method assumes time synchronization between fixtures detecting commissioning sounds. The synchronization is used so that the time-of-arrival of each received sound can be reported to a central processor, which can then directly process the measured timestamps to figure out the physical relationship of the lighting fixtures. As is familiar to persons having ordinary skill in the art, synchronization may be accomplished by several means, for example, using a master clock, or using independent clocks. However, if an independent clock in each fixture is not synchronized with those in every other fixture, it may not be possible to achieve sufficient timing precision to accurately compare events measured at different fixtures.

A second exemplary method embodiment for commissioning fixtures with sounds according to a prescribed path does not assume that the fixtures are synchronized. The second embodiment makes use of the fact that any timestamps for other events measured at that same fixture are comparable, even though events measured by a neighboring fixture are not. This assumes that the drift of a clock for each fixture is negligible over the period of the commissioning process. In other words, no particular clock is ticking significantly faster or slower than others, even though they are expected to be showing different times. By analogy, clocks showing the local time in Washington and Tokyo would be expected to show a different time to a similar clock in Greenwich, however presumably all three clocks nevertheless tick at the same rate.

Since, under the second embodiment, clocks for each fixture generally run at substantially the same speed relative to one another, the interval between received commissioning sounds at each separate fixture may be measured and compared to the intervals measured by neighboring fixtures with independent clocks.

When the commissioner 200 (FIG. 2) moves towards a particular fixture, at a distance from the fixture, where the distance is significantly greater than the height of the fixture above the floor, the time interval between successive footsteps sounds arriving at the fixture is less than the interval at which the sounds are produced by footsteps. This is because the distance the sound travels reduces with each successive footstep as the commissioner 200 (FIG. 2) approaches the fixture.

Conversely, when the commissioner moves away from the fixture beyond a distance significantly greater than the height of the fixture above the floor, the interval between sounds arriving at the fixture becomes somewhat greater than the interval at which the sounds are produced.

Figure 7:
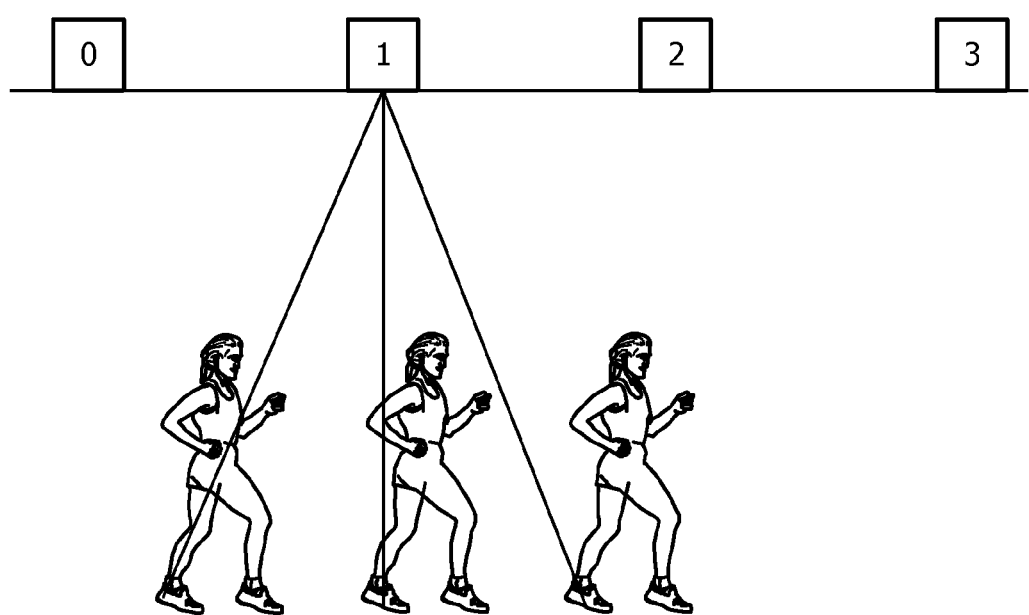
FIG. 7 is a diagram illustrating the geometry of the time of flight path as a commissioning sound source passes beneath a luminaire.

When the commissioner passes by underneath a particular fixture (see FIG. 7), the intervals transition from being smaller than the generation intervals to greater than the generation intervals.

The relative position of the fixtures can be established by comparing each fixture's measurement of the interval between successive sounds. This comparison may be made, for example, by a central controller or by the fixtures themselves operating in pairs or groups. For example, if a first fixture measures a first interval that is less than a second interval measured by a second fixture, it may be determined that the commissioner is moving towards the first fixture and away from the second fixture.

As the commissioner moves around the room, these comparison results change according to where the commissioner goes. If the commissioner passes under a sequence of lights, each light will in turn transition between walking towards and walking away conditions, allowing the sequence to be determined. This allows the lighting layout to be established, even if the commissioner follows an arbitrary path that is not previously known by the processor.

If the intervals for each footstep are listed in order from smallest to largest, those fixtures near one end of the list may be assumed to be located apart from those at the other end of the list. As the commissioner proceeds, some fixtures will transition from, for example, the small end of the list to the large end, or from the large end of the list to the small end of the list, indicating that a fixture moving from one end of the list to the other is in close proximity with other fixtures that made similar recent transitions.

Fixtures that are in the middle of the sorted list of intervals may in some instances be devices that are undergoing a transition as the commissioner passes underneath, or nearby, to the fixture. More commonly, such a fixture is to one side or the other of current path of the commissioner, such the relative motion is tangential.

For example, for direct motion away from or towards a fixture at a distance of around ten times the height of the ceiling, the interval between footstep sound arrivals varies by approximately 15 ms. This is well within the measurement ability of practical, cheap processing devices.

Commissioning Method Detecting Continuous Sounds Along a Prescribed Path

The first and second embodiments describe using time of flight calculations to locate a commissioning sound that may be generally described as a limited duration sound. As such, the fixtures are located under the first and second embodiments by comparing the time of flight of the commissioning sound from the source of the sound to the fixture. Under a third exemplary method embodiment, a sound generator is employed that generates a substantially continuous tone of a known frequency. The sound generator is moved along a prescribed path through the fixtures according to a building plan. It should be noted that while the sound generator under the third embodiment is generally described as generating a continuous tone, there is no objection to the sound generator creating tones that are not continuous, for example, a periodic tone, providing the frequency of the tone is fixed.

The third embodiment uses a constant tone oscillator to leverage the Doppler Effect. According to the Doppler Effect, a perceived pitch (frequency) of a tone is higher if the source of the sound approaches the receiver, and lower if the sound source moves away from the receiver. Under the third embodiment, fixtures detect changes in frequency of a constant tone rather than time of arrival of a limited duration sound, as under the first and second embodiment.

A general equation for the perceived frequency of a tone is given by Eq. 3, $$f = \left(\frac{c \pm v_r}{c \pm v_s}\right) f_0 \quad \text{(Eq. 3)}$$

where:
$f_0$=emitted frequency from source
f=Observed frequency at receiver
$V_r$=velocity of receiver relative to medium
$V_s$=velocity of source relative to medium
C=propagation velocity of sound Assuming the receiver is stationary results in a simplified equation.

$$f = \left(\frac{c}{c \pm v_s}\right) f_0 \quad \text{(Eq. 4)}$$

From Eq. 4, it will be apparent to a person having ordinary skill in the art that choosing a high frequency for $f_0$ results is a larger Doppler effect than a low frequency. Therefore, it may be preferable to choose a frequency near to the upper frequency response of the receiving microphone. A high frequency might also be preferable in terms of minimizing disturbance for the human ear.

Figure 8A:
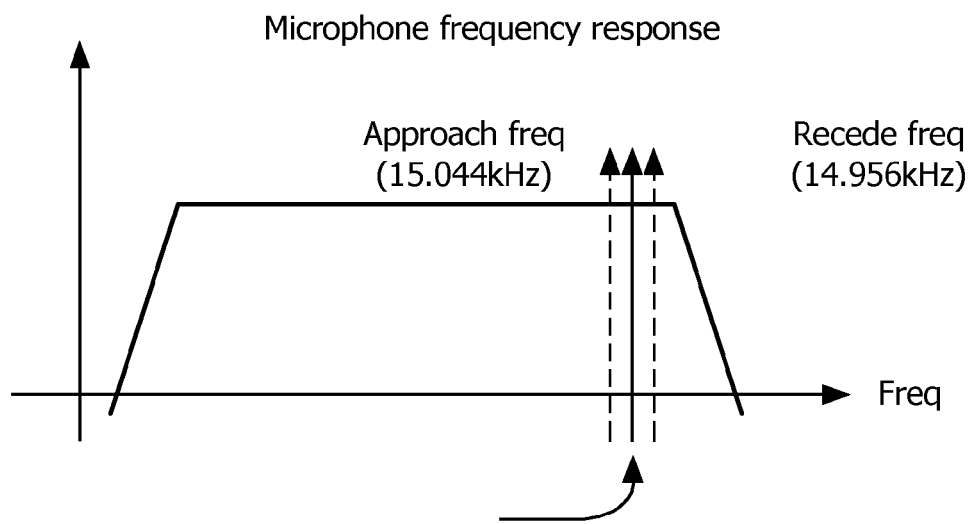
FIG. 8A is a frequency plot of a detected Doppler shift for a continuous signal used for lighting commissioning.
Figure 8B:
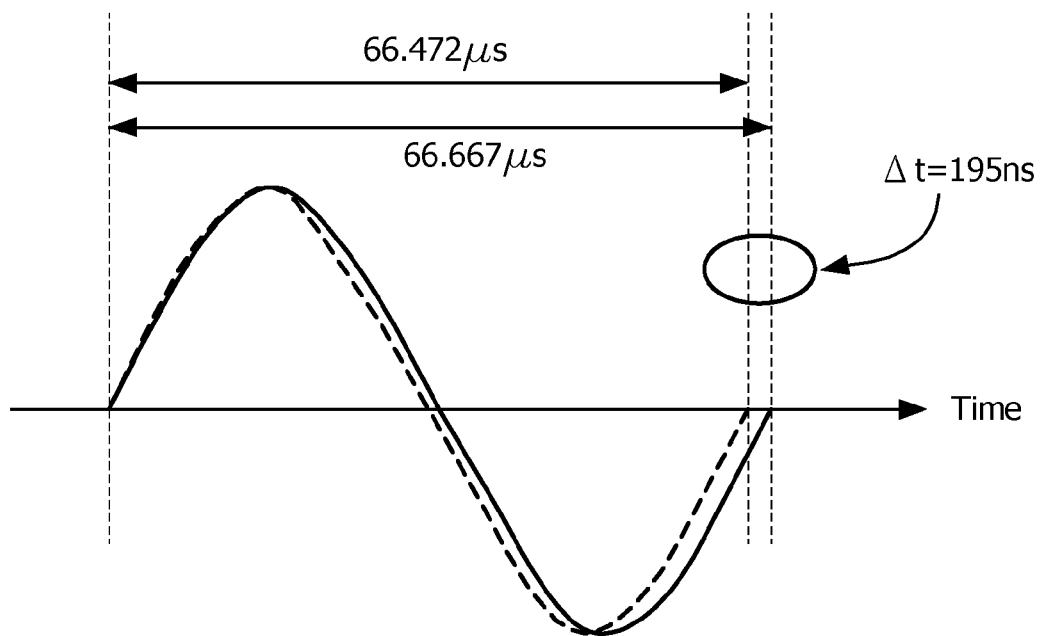
FIG. 8B is a timing diagram of a continuous signal used for lighting commissioning.

Plots showing the Doppler Effect of a 15 KHz tone moving at 1 m/s are shown in FIGS. 8A and 8B. Assuming sound travels at 343 m/s and people walk at 1 m/s, a 15 KHz tone may be perceived as a 14.956 kHz tone when the sound source moving toward the listener, or 15.044 kHz by a listener moving away from the sound source. As shown by FIG. 8B, the perceived difference results from the sound waves being compressed when moving toward the listener, so that a complete cycle of a pure sine wave tone arrives in less time, specifically, in 195 ns less time, when the sound source is moving toward the listener. More specifically, $$f = \left(\frac{343}{343 \pm 1}\right) \cdot 15 \text{ kHz} = 15 \text{ kHz} \pm 43.86 \text{ Hz} \quad \text{(Eq. 5)}$$

In a single cycle of generated 15 kHz tone, the time difference caused by a walking sound source will be approximately 200 ns. Assuming the tone is received by a microphone and sampled at standard CD audio sampling rates (44.1 kHz), 250 cycles would need to be received before a change in frequency would be detected. At 15 kHz, 250 cycles represents approximately 17 ms. The relatively fast detection time of a frequency change due to the Doppler Effect compared with the speed a commissioner 200 (FIG. 2) travels indicates the suitability of the third embodiment as a commissioning method. Like the second embodiment, the third method does not assume time synchronization of the fixtures being commissioned, or at most, a rough synchronization on the order of seconds instead of milliseconds.

Returning to FIG. 3, for example, under the third embodiment, a luminaire 140-149 may send a message when it detects a change in received frequency. Therefore, the location of the luminaire 140-149 relative to a building plan 100 may be determined by cross referencing the time each luminaire 140-149 detects a frequency change with the commissioning path 300 (FIG. 3) in the building plan 100.

Figure 9:
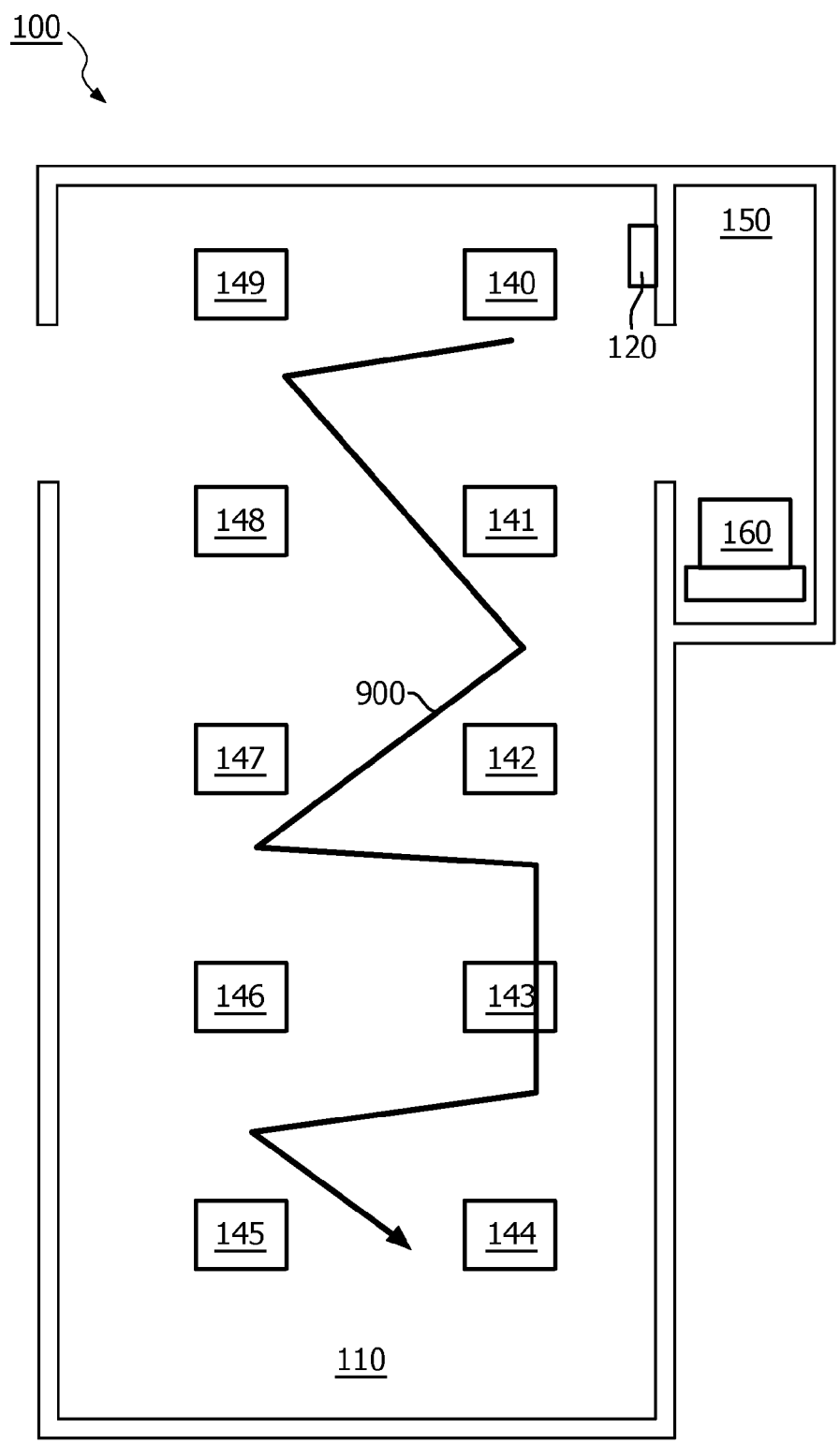
FIG. 9 illustrates an exemplary embodiment of an arbitrary path superimposed on the simplified building plan.

Commissioning Method with Synchronized Luminaires Detecting Limited Duration Commissioning Sounds Along an Arbitrary Path The first, second and third embodiments generally assume the commissioner 200 (FIG. 2) moves along a prescribed commissioning path 300 (FIG. 3) through building according to the building plan 100 (FIG. 3). As shown by FIG. 9, a fourth exemplary embodiment of a method for commissioning lighting fixtures using sound does not assume a prescribed commissioning path 300 (FIG. 3). Instead, under the fourth embodiment, the commissioner 200 (FIG. 2) may take an arbitrary path 900 through the first room 110, wherein the location of the commissioner 200 (FIG. 2) may not be assumed in advance. Under the fourth embodiment, a limited duration commissioning sound is used, and the luminaires 140-149 are time synchronized to approximately one millisecond granularity.

The fourth embodiment is based upon detecting when the commissioner 200 (FIG. 2) walks under one of the luminaires 140-149, by subtracting the time difference of arrival (TDOA) of an earliest commissioning sound detection from the TDOA of a second earliest commissioning sound detection. If this difference is greater than a threshold time the commissioning sound may be regarded as emanating from under a luminaire 140-149, and the identity of neighboring luminaires may then be determined.

Figure 10:
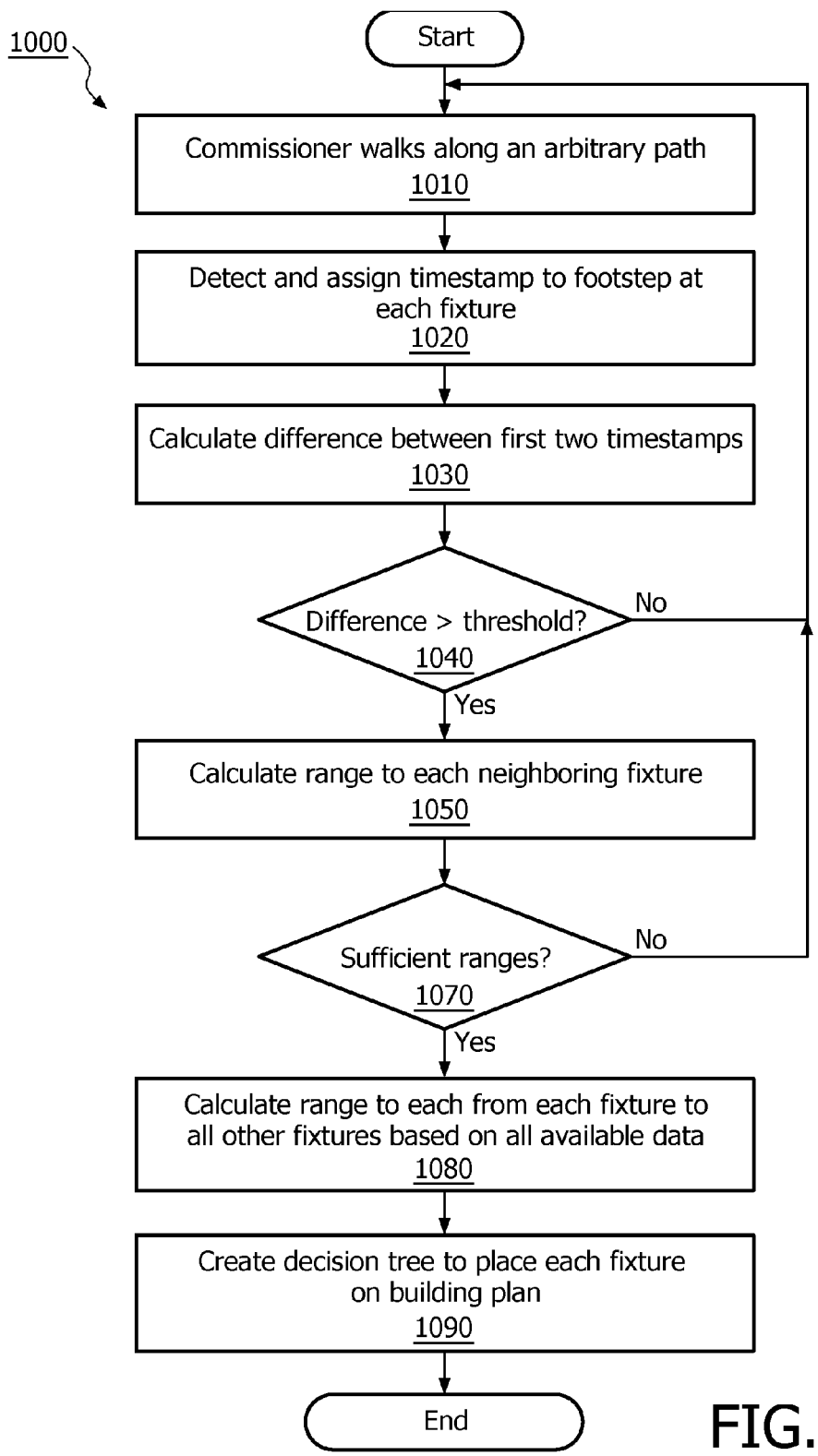
FIG. 10 is a flowchart of an exemplary method for commissioning lighting with sounds along an arbitrary path.

FIG. 10 is a flowchart demonstrating the fourth embodiment. The commissioner 200 (FIG. 2) walks along an arbitrary path 900 (FIG. 9) among the fixtures, as shown by block 1010. As noted previously, a fixture may be, for example, but not limited to, a luminaire, a light control, and/or a sensor. The commissioner 200 (FIG. 2) periodically generates a commissioning sound, for example, a footstep. As shown by block 1020, each fixture detects each commissioning sound in the vicinity of the fixture, and a timestamp corresponding the time of detection of the commissioning sound is assigned. The earliest two timestamps corresponding to a particular commissioning sound are identified and compared, as shown by block 1030. If the difference between the earliest two times exceeds a time threshold, the commissioning sound may be considered to have occurred closest to the fixture associated with the first timestamp. If, in contrast, the difference in time between the first two timestamps is below the time threshold, it may be unclear which fixture the commissioning sound was closest to, and the data corresponding to the commissioning sound may be disregarded in favor of a subsequent commissioning sound.

The commissioning sound has been associated with a fixture closest to it, but that fixture is not yet mapped to the building plan. The range to each neighboring fixture is calculated, as shown by block 1050.

The range to each neighboring fixture from that current closest fixture to the commissioner 200 (FIG. 2), $Range_{device}$, may be calculated using Eq. 6, $$Range_{device} = \text{height of ceiling} + (TDOA_{device} - TDOA_{earliestDevice}) * C_{sound} \quad \text{(Eq. 6)}$$

where $C_{sound}$ represents the speed of sound.

If there is enough data to establish the ranges, as shown by block 1070, the range from each fixture to every other fixture detecting the commissioning sound is calculated, as shown by block 1080. A decision tree is created to place each fixture on the building plan, as shown by block 1090.

If, during the time the commissioner 200 (FIG. 2) is traversing the arbitrary commissioning path 900 (FIG. 9), the threshold conditions are met again for the same fixture, a data set from a number of alternative sets of range measurements can be collected. Some statistical analysis can be performed on this data set to resolve all the range measurements into a table of more accurate range measurements between each fixture and its near neighbors. Once sufficient range measurements are made, the decision tree may be used to resolve the identity of every fixture in the building plan.

As described above, under the fourth embodiment, a limited duration commissioning sound is used, and the luminaires 140-149 are time synchronized to approximately one millisecond granularity. However, the above commissioning method is similarly applicable for commissioning according to a commissioner 200 (FIG. 2) travelling along an arbitrary path 900 using a continuous commissioning sound, where the luminaires 140-149 may only be roughly synchronized.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

What is claimed is:

1. A method for automatically commissioning a first fixture having a first microphone and a second fixture having a second microphone according to a building plan having a first mapped location and a second mapped location, the method comprising the steps of:
- generating a first sound at a first location;
- detecting said first sound by said first microphone and by said second microphone;
- recording a first time when said first microphone detects said first sound, and a second time when said second microphone detects said first sound;
- generating a second sound at a second location;
- detecting said second sound by said first microphone and by said second microphone; and
- recording a third time when said first microphone detects said second sound, a fourth time when said second microphone detects said second sound;
- associating said first fixture with said first mapped location, wherein said associating is based in part upon said first, second, third, and fourth time.

2. The method of claim 1, further comprising the step of associating said second fixture with said second mapped location.

3. The method of claim 1, further comprising the steps of:
- determining a first distance between said first microphone and said first location, based upon said first time;
- determining a second distance between said second microphone and said first location, based upon said second time;
- determining a third distance between said first microphone and said second location, based upon said third time; and
- determining a fourth distance between said second microphone and said second location, based upon said fourth time.

4. The method of claim 3, wherein said first location and said second location are along an arbitrary path.

5. The method of claim 3, further comprising the step of determining a fifth distance between said first microphone and said second microphone based in part upon said first, second, third and fourth time.

6. The method of claim 1, wherein said first location and said second location are substantially along a predetermined path.

7. The method of claim 1, wherein said first sound is a first footstep and said second sound is a second footstep.

8. The method of claim 1, wherein said first fixture comprises a first luminaire and said second fixture comprises a second luminaire.

9. The method of claim 7, further comprising the step of acknowledging said associating said first fixture with said first mapped location with a visible response by said first luminaire.

10. The method of claim 1, wherein said first fixture further comprises a first clock, and said second fixture further comprises a second clock.

11. The method of claim 10, further comprising the step of synchronizing said first clock with said second clock.

12. The method of claim 1, further comprising the steps of:
- generating a third sound, wherein said third sound is audibly distinct from said first sound and said second sound; and
- detecting said third sound with said first microphone;
- wherein said first sound is substantially audibly indistinguishable from said second sound.

13. The method of claim 12, further comprising the step of:
- in response to said detecting said third sound, dis-associating said first fixture with said first mapped location and/or ending said automatic commissioning method.

14. A method for automatically commissioning a first fixture having a first microphone and a second fixture having a second microphone according to a building plan having a first mapped location and a second mapped location, the method comprising the steps of:
- generating a substantially fixed frequency tone with a tone generator at a first location detecting said tone by said first microphone and by said second microphone;
- moving said tone generator to a second location;
- detecting a Doppler shift of said tone by said first microphone; and
- associating said first fixture with said first mapped location.

15. A system for automatically commissioning fixtures according to a building plan having a first mapped location and a second mapped location, comprising:
- a lighting control system in communication with a data network;
- a first fixture comprising a first microphone in communication with said data network, wherein said first fixture is configured to transmit detection notification of each of a plurality of sounds to said lighting control system; and
- a second fixture comprising a second microphone in communication with said data network, wherein said second fixture is configured to transmit detection notification of each of said plurality of sounds to said lighting control system;
- wherein said lighting control system is configured to associate said first fixture with said first mapped location and said second fixture with said second mapped location based upon receiving said detection of said plurality of sounds from said first fixture and said second fixture,
- wherein said data network is a wired network configured for communicating data over power lines providing power to said first fixture, said second fixture, and said lighting control system.

16. The system of claim 15, wherein said data network is a wireless network.

17. The system of claim 15, wherein said plurality of sounds are footsteps.

* * * * *